United States Patent
Aitken et al.

(10) Patent No.: US 10,047,785 B2
(45) Date of Patent: Aug. 14, 2018

(54) THERMAL SECURING SET SCREWS

(71) Applicant: Halliburton Energy Services, Inc., Houston, TX (US)

(72) Inventors: Liam Andrew Aitken, Grapevine, TX (US); Stephen Michael Greci, Little Elm, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 255 days.

(21) Appl. No.: 14/363,101

(22) PCT Filed: May 21, 2013

(86) PCT No.: PCT/US2013/042034
§ 371 (c)(1),
(2) Date: Jun. 5, 2014

(87) PCT Pub. No.: WO2014/189493
PCT Pub. Date: Nov. 27, 2014

(65) Prior Publication Data
US 2016/0138642 A1    May 19, 2016

(51) Int. Cl.
*F16B 39/01*    (2006.01)
*F16B 33/00*    (2006.01)
(Continued)

(52) U.S. Cl.
CPC ............. *F16B 39/01* (2013.01); *E21B 34/06* (2013.01); *F16B 33/004* (2013.01); *F16B 35/005* (2013.01); *F16B 39/02* (2013.01)

(58) Field of Classification Search
CPC . F16L 19/00; F16L 19/02; F16L 21/04; F16L 55/1108; F16L 19/04; F16L 19/055;
(Continued)

(56) References Cited

U.S. PATENT DOCUMENTS 3,227,147 A * 1/1966 Gossiaux ............. F02M 55/005
123/468
3,687,183 A    8/1972 Rohm
(Continued)

FOREIGN PATENT DOCUMENTS

EP    2085448 A1    8/2009
JP    03213567    *    9/1991
(Continued)

OTHER PUBLICATIONS

International Search Report and Written Opinion for PCT/US2013/042034 dated Feb. 12, 2014.
(Continued)

*Primary Examiner* — Eugene G Byrd
(74) *Attorney, Agent, or Firm* — McDermott Will & Emery LLP

(57) ABSTRACT

A metal fastener is provided having a first threaded screw portion for engaging a complementary threaded portion of a bore of a metal member at a first temperature, and a sealing portion disposed proximal a distal end of the first screw portion, the sealing portion having a greater coefficient of thermal expansion than the metal member, wherein the sealing portion is configured to thermally expand and provide a seal between the sealing portion and an inner circumference of the bore at a second temperature higher than the first temperature, such that the first screw portion of the fastener is immobile relative to the bore at the second temperature.

19 Claims, 4 Drawing Sheets

(51) Int. Cl.
*E21B 34/06* (2006.01)
*F16B 35/00* (2006.01)
*F16B 39/02* (2006.01)

(58) Field of Classification Search
CPC ......... F16L 33/224; F16J 15/184; F16J 15/20; F16B 39/01; F16B 35/005; F16B 39/02; E21B 34/06
See application file for complete search history.

(56) References Cited

U.S. PATENT DOCUMENTS

| | | | |
|---|---|---|---|
| 4,834,569 A | 5/1989 | Foote et al. | |
| 5,628,517 A * | 5/1997 | Jia | F16J 15/0887 277/314 |
| 7,607,456 B1 * | 10/2009 | Schulz | F16L 55/1141 138/89 |
| 7,874,059 B2 * | 1/2011 | Morrison | F16B 5/0266 29/446 |
| 2005/0119401 A1 | 6/2005 | Bavouzet et al. | |
| 2006/0128597 A1 | 6/2006 | Chen et al. | |
| 2008/0194435 A1 | 8/2008 | Huff et al. | |
| 2011/0127771 A1 | 6/2011 | Panusa | |
| 2012/0148867 A1 * | 6/2012 | Chang | C04B 37/026 428/627 |
| 2012/0280495 A1 | 11/2012 | Ben-Reuven et al. | |
| 2013/0001891 A1 * | 1/2013 | Tower | F02M 55/005 277/591 |

FOREIGN PATENT DOCUMENTS

| | | |
|---|---|---|
| JP | 2007248015 A | 9/2007 |
| JP | 2009158936 A | 7/2009 |
| KR | 10-2005-0002750 | 1/2005 |
| KR | 20050002750 A * | 1/2005 |
| WO | 2014189493 A1 | 11/2014 |

OTHER PUBLICATIONS

Official Action for Canadian Patent Application No. 2,809,403 dated Jul. 28, 2014.

* cited by examiner

THERMAL SECURING SET SCREWS

BACKGROUND

The present invention relates to mechanical fasteners, such as screws, bolts, pins, etc., that utilize a difference in thermal coefficients between the fastener and surrounding material (e.g., a threaded housing or a passage) to create a seal and maintain the mechanical fastener secure in extreme temperatures.

High temperature and/or high pressure environments present challenges for fasteners such as screws, bolts, pins, etc. that are relied upon to provide a seal and/or to remain secure. For example, in hydrocarbon production wells, it is often beneficial to regulate the flow of formation fluids from a subterranean formation into a wellbore penetrating the same. A number of devices known as inflow control devices ("ICDs") are available for regulating the flow of formation fluids. Some ICDs are simple on/off valves, others are metered to provide a desired flow rate, and still others discriminate between different types of formation fluids. ICDs can include, for example, tubular flow restrictors and nozzle-type flow restrictors.

It is common for nozzle-type ICDs operating at extreme high temperatures and pressures to include housings with passages into which an adjustable rod can be inserted to block or adjust fluid flow. A set screw or other threaded fastener is typically used to close off the end(s) of the passage and retain the rod in the passage. At high temperatures, the screw(s) can often become loose and/or allow leakage into or out of the passage due to thermal "growth" of the housing, which is typically made of steel or another material similar to that of the screw(s).

To prevent leaking and loosening of threaded fasteners, chemical sealants such as LOCTITE™, and mechanical means such as safety wire, screws, or O-rings have been used in the past. However, these conventional sealing and thread locking schemes often are not adequate to prevent leakage at extremely high temperatures.

SUMMARY OF THE DISCLOSURE

The present invention relates to mechanical fasteners, such as screws, bolts, pins, etc., that utilize a difference in thermal coefficients between the fastener and surrounding material (e.g., a threaded housing or a passage) to create a seal and maintain the mechanical fastener secure in extreme temperatures.

In some embodiments, the present disclosure provides a metal fastener comprising a first threaded screw portion for engaging a complementary threaded portion of a bore of a metal member at a first temperature; and a sealing portion disposed proximal a distal end of the first screw portion. The sealing portion has a greater coefficient of thermal expansion than the metal member, for providing a seal between the sealing portion and substantially the entire circumference of the bore at a second temperature higher than the first temperature, such that the first screw portion of the fastener is immobile relative to the bore at the second temperature.

In other embodiments, a method of sealing a bore of an inflow control device is disclosed. The method may include introducing a fastener into the bore as defined in a metal member, the fastener having a first threaded screw portion and a sealing portion disposed proximal a distal end of the first screw portion, sealing the bore with the first threaded screw portion when the inflow control device is at a first temperature, sealing the bore with the sealing portion when the inflow control device is at a second temperature, the second temperature being greater than the first temperature and the sealing portion having a greater coefficient of thermal expansion than the metal member.

The features and advantages of the present disclosure will be readily apparent to those skilled in the art upon a reading of the description of the preferred embodiments that follows.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
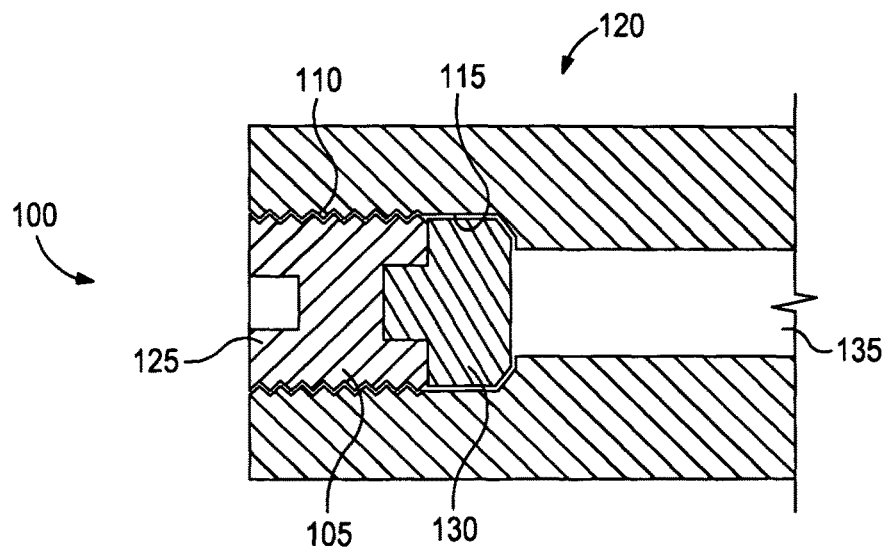
FIG. 1 is a cross-sectional view of a fastener according to an embodiment of the present disclosure.

The present invention relates to mechanical fasteners, such as screws, bolts, pins, etc., that utilize a difference in thermal coefficients between the fastener and surrounding material (e.g., a threaded housing or a passage) to create a seal and maintain the mechanical fastener secure in extreme temperatures, where typical mechanical fasteners would become loose or lose their seal.

In certain disclosed embodiments, the mechanical fastener is threaded into a housing made of steel, for example. The body of the mechanical fastener is also made of steel, but the tip or end of the mechanical fastener may be made of a material having a higher thermal coefficient than the housing (e.g., brass, copper, tin, etc.). The tip of the mechanical fastener may be threaded or unthreaded. During installation at ambient temperatures, the threading between the mechanical fastener and the housing provides a seal between the two components. When the temperature is increased, however, the material having a higher thermal coefficient expands more than the housing and the other portion(s) of the fastener, thereby creating a more robust seal and helping to retain the mechanical fastener within the housing.

In other embodiments, the portion of the mechanical fastener that is made of a material having a higher thermal coefficient than the housing (e.g., brass, copper, tin, etc.) may also be threaded. In further embodiments, the portion of the mechanical fastener made of material having a higher thermal coefficient than the housing may be an intermediate piece or portion (threaded or unthreaded), while portions at its opposing ends may be made of steel or the like, and otherwise are straight thread set screws.

To facilitate a better understanding of the present disclosure, the following examples of preferred or representative embodiments are given. In no way should the following examples be read to limit, or to define, the scope of the disclosure.

Embodiments disclosed herein include a metal fastener comprising a first threaded screw portion for engaging a complementary threaded portion of a bore of a metal member at a first temperature, and a sealing portion disposed proximal a distal end of the first screw portion. The sealing portion may exhibit a greater coefficient of thermal expansion than the metal member. As a result, the sealing portion may be configured to provide a seal between the sealing portion and substantially the entire circumference of the bore at a second temperature that is higher than the first temperature, such that the first screw portion of the fastener is immobile relative to the bore at the second temperature.

These embodiments may have one or more of the following additional elements in any combination: the first threaded screw portion of the fastener may be made of substantially the same material as the metal member. The first screw portion of the fastener may include a head at a first distal end, and the sealing portion may be attached to a second distal end of the first screw portion of the fastener. The sealing portion may be threaded to engage the threaded portion of the bore.

In some embodiments, the metal member may include or otherwise define a passage in communication with the threaded portion of the bore, and the sealing portion may be shaped to engage the bore to substantially seal the threaded portion of the bore from the passage at the second temperature. In other embodiments, the metal member may include or otherwise define an unthreaded passage in communication with the threaded portion of the bore, and the sealing portion may be shaped to extend into the unthreaded passage to substantially seal the threaded portion of the bore from the unthreaded passage.

In at least one embodiment, the first screw portion and the metal member may be made of steel, and the sealing portion may be made of at least one of brass, copper, and tin. The coefficient of thermal expansion of the sealing portion may be at least ten percent higher than the coefficient of thermal expansion of the metal member. The sealing portion may include a central part that may be made of carbide or the like, and a surrounding outer part that may be made of brass. The fastener may further include a second threaded screw portion that may be made of substantially the same material as the first screw portion for engaging the threaded portion of the bore. In such embodiments, the sealing portion may be disposed proximal a distal end of the second screw portion, and otherwise arranged between the first screw portion and the second screw portion within the bore.

Fasteners according to the present disclosure will now be described with reference to the figures. Referring now to FIG. 1, illustrated is a metal fastener 100 that may include a threaded screw portion 105, according to one or more embodiments. The threaded screw portion 105 may be configured to engage a complementary threaded portion 110 of a bore 115 of a metal member 120 at an initial temperature. In some embodiments, the initial temperature is room temperature. In other embodiments, the initial temperature may be greater or less than room temperature, without departing from the scope of the disclosure.

The metal member 120 may be, for example, a steel housing configured to receive the fastener 100. In one or more embodiments, the screw portion 105 of the fastener 100 may also be made of steel. In certain embodiments, the member 120 and the screw portion 105 may be made of substantially the same material, such as stainless steel, tungsten carbide steel, or other like materials.

The fastener 100 may also include a head 125 at one end of the screw portion 105 and a sealing portion 130 attached or otherwise arranged at the other or opposing end. In at least one embodiment, the screw portion 105 may encompass a conventional hex head engagement. The sealing portion 130 may have or otherwise exhibit a greater coefficient of thermal expansion than the member 120. In some exemplary embodiments, for example, the member 120 and the screw portion 105 may be made of steel, and the sealing portion 130 may be made of at least one of brass, copper, and tin. In general, the coefficient of thermal expansion of the sealing portion 130 may be at least ten percent higher than the coefficient of thermal expansion of the metal member 120.

The following table lists exemplary materials that may be used in practicing the present disclosure, along with their respective coefficients of thermal expansion. The first listed material is a stainless steel that may be used for the member 120 and the screw portion 105, and is listed for comparison with the rest of the materials. The remainder of the listed materials may be usable for the sealing portion 130. As can be seen, the coefficient of thermal expansion of the materials usable for the sealing portion 130 are generally higher than that of steel. It should be noted that these materials are usable with any the disclosed embodiments. For instance, a polymer may be used in place of a metal material having a higher thermal coefficient.

| Material | Coefficient of thermal expansion ($10^{-6}$ in/in × F) |
| --- | --- |
| Stainless Steel 316L | 9.9 |
| Glass fiber-reinforced acrylonitrile butadiene styrene (ABS) | 17 |
| Brass | 10.4 |
| Epoxy | 31 |
| Lead | 15.1 |
| Polycarbonate (PC) | 39 |
| Polypropylene-glass fiber-reinforced | 18 |
| Polyurethane (PUR), rigid | 32 |
| Tin | 13 |
| Zinc | 16.5 |
| Polyether ether ketone (PEEK) | 26 |

In exemplary operation, the sealing portion 130 may be used to provide a seal between the sealing portion 130 and substantially the entire inner circumference of the bore 115 at a temperature higher than the initial temperature. In some embodiments, the elevated temperature may be about 150° C. greater than the initial temperature, about 200° C. greater than the initial temperature, about 250° C. greater than the initial temperature, and greater than 250° C. greater than the initial temperature. At the elevated temperature, the screw portion 105 may thermally expand and thereby become immobile relative to the bore 115. In the embodiment shown in FIG. 1, the member 120 may define or otherwise include a passage 135 in fluid communication with the threaded portion 110 of the bore 115, and the sealing portion 130 may be generally shaped to engage the bore 115 and thereby substantially seal the threaded portion 110 of the bore 115 fluid against passage 135 at the elevated temperature.

Figure 5:
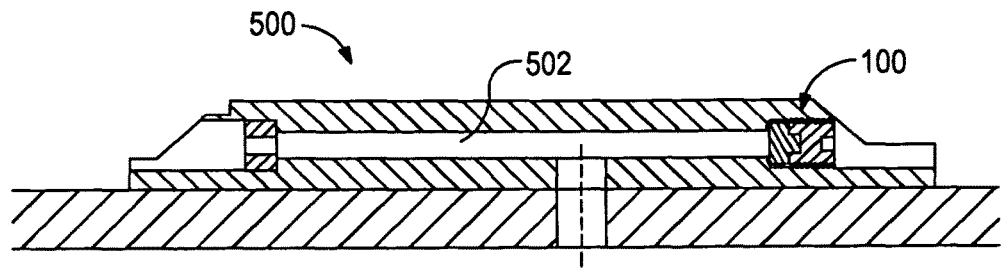
FIG. 5 is a cross-sectional view of an ICD using the fastener of FIG. 1.

FIG. 5 shows the exemplary fastener 100 as installed in an exemplary ICD 500 to seal a passage 502.

Figure 2:
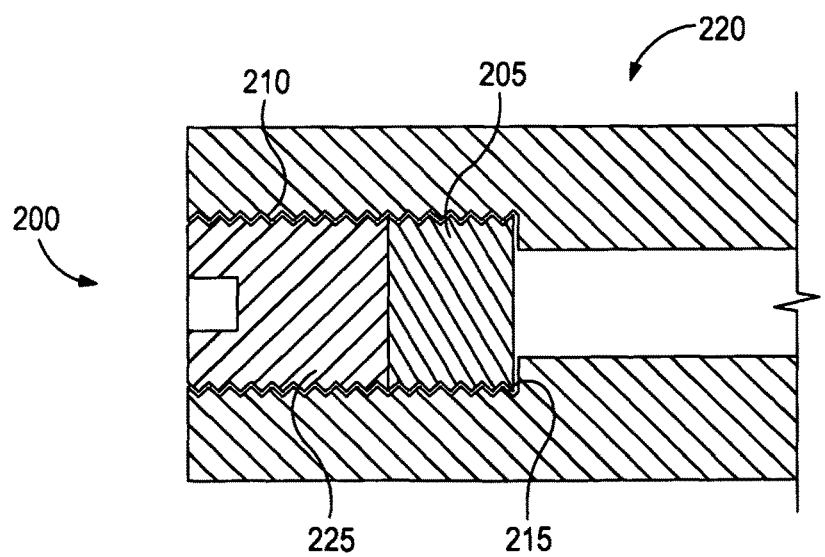
FIG. 2 is a cross-sectional view of a fastener according to another embodiment of the present disclosure.

Referring now to FIG. 2, another exemplary fastener 200 is illustrated, according to one or more embodiments. The fastener 200 may include a sealing portion 205 and a screw portion 225. As illustrated, the sealing portion 205 may be threaded to engage a threaded portion 210 of a bore 215 of a metal member 220 contiguous with the screw portion 225. The relevant thermal and material characteristics of the fastener 200 (including the sealing portion 205 and the screw portion 225), and of the member 220 are otherwise the same as the fastener 100 and member 120 described with reference to FIG. 1. Therefore, a detailed description will not be repeated here.

In some embodiments, the sealing portion 205 may be attached to the screw portion 225 as in the embodiment of FIG. 1. However, in other embodiments, the sealing portion 205 may be separable from the screw portion 225 at the initial temperature, and disposed proximal the screw portion 225 in the bore 215 such that the sealing portion 205 seals and locks the screw portion 225 in place at the elevated temperature.

Figure 6:
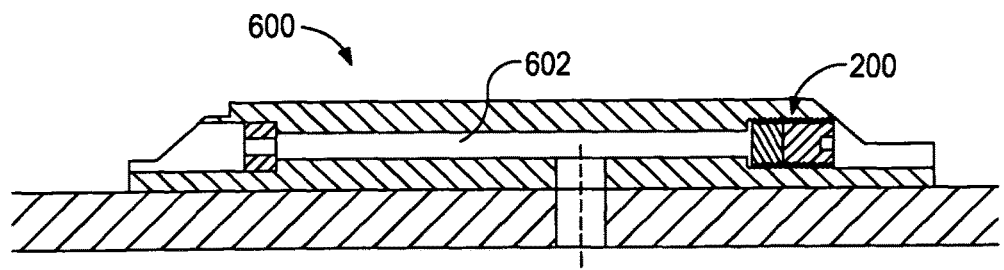
FIG. 6 is a cross-sectional view of an ICD using the fastener of FIG. 2.

FIG. 6 shows the exemplary fastener 200 installed in an ICD 600 to seal a passage 602.

Figure 3:
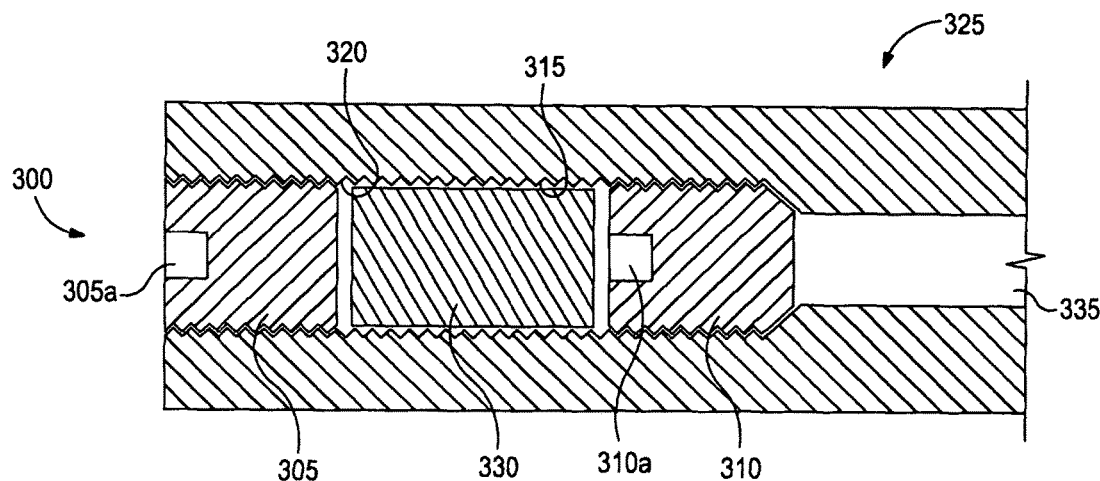
FIG. 3 is a cross-sectional view of a fastener according to yet another embodiment of the present disclosure.

Referring now to FIG. 3, illustrated is another exemplary fastener 300, according to one or more embodiments. As depicted, the fastener 300 may include a first threaded screw portion 305 and a second threaded screw portion 310 for engaging a complementary threaded portion 315 of a bore 320 of a metal member 325 at an initial temperature (e.g., room temperature). As in the embodiments of FIGS. 1 and 2, the member 325 may be, for example, a steel housing and the screw portions 305, 310 of the fastener 300 may are be made of steel. In certain embodiments, the member 325 and the screw portions 305, 310 may be made of substantially the same materials, such as stainless steel, tungsten carbide steel, etc.

The fastener 300 may also include a head 305a at one end of the first screw portion 305, and a head 310a at one end of the second screw portion 310. In some embodiments, at least one of the heads 305a, 310a may encompass or otherwise be a conventional hex head engagement. A sealing portion 330 may be arranged or otherwise disposed between the first screw portion 305 and the second screw portion 310, and proximal to an end of each of the screw portions 305, 310. The sealing portion 330 may exhibit a greater coefficient of thermal expansion than the member 325. In some exemplary embodiments, the member 325 and the screw portions 305, 310 may be made of steel, and the sealing portion 330 may be made of at least one of brass, copper, and tin. In general, the coefficient of thermal expansion of the sealing portion 330 may be at least ten percent higher than the coefficient of thermal expansion of the metal member 325.

The sealing portion 330 may be configured to provide a seal between the sealing portion 130 and substantially the entire inner circumference of the bore 320 at an elevated temperature (e.g., 200° C.) higher than the initial temperature, such that the screw portions 305, 310 become immobile relative to the bore 320 at the elevated temperature. In the embodiment shown in FIG. 3, the member 325 may define or otherwise provide a passage 335 in fluid communication with the threaded portion 315 of the bore 320. In exemplary operation, the sealing portion 330 (along with the screw portions 305, 310) may be configured to substantially seal the threaded portion 315 of the bore 320 from the passage 335 at the elevated temperature.

Figures 4A, 4B:
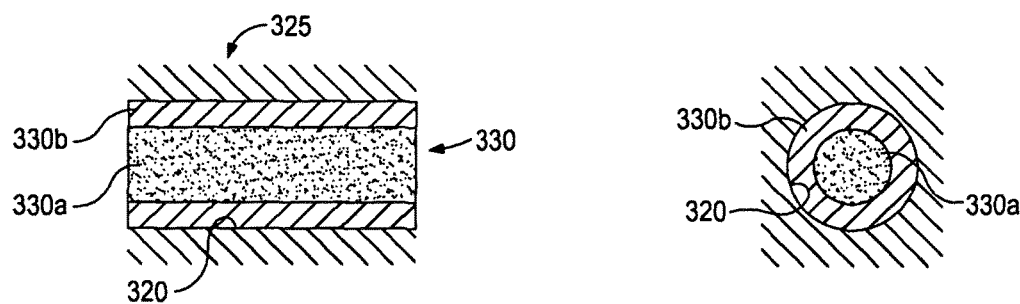
FIGS. 4A-4B are cross-sectional views of a composite sealing portion according to an embodiment of the present disclosure.

In another embodiment shown in FIGS. 4A-4B, with continued reference to FIG. 3, the sealing portion 330 may be a composite having a carbide central part 330a and a surrounding outer part or sleeve 330b. In at least one embodiment, the sleeve 330b may be made of brass, or another material exhibiting a coefficient of thermal expansion that is greater than that of the member 325. In exemplary operation, the carbide central part 330a will not thermally "grow" at elevated temperatures, but the brass sleeve 330b may be configured to thermally expand to act as a plug in the bore 320. Those skilled in the art will readily appreciate that this composite sealing portion 330 can be equally used as appropriate with any of the disclosed embodiments of the fastener, without departing from the scope of the disclosure.

Figure 7:
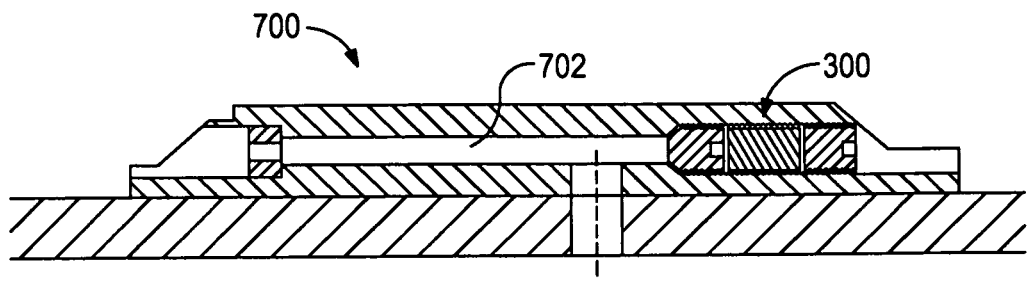
FIG. 7 is a cross-sectional view of an ICD using the fastener of FIG. 3.

FIG. 7 shows the exemplary fastener 300 installed in an ICD 700 to seal a passage 702.

Figure 8:
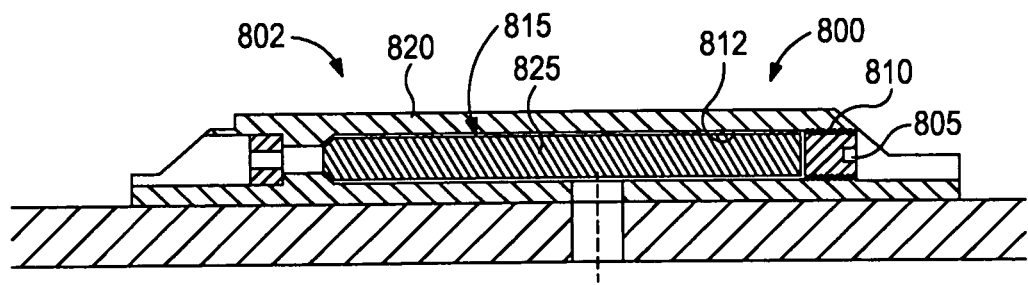
FIG. 8 is a cross-sectional view of an ICD using a fastener according to a further embodiment of the present disclosure.

Referring now to FIG. 8, illustrated is another exemplary metal fastener 800, according to one or more embodiments. As illustrated, the fastener 800 may be installed in an ICD 802 that may include a metal member 820 that defines a bore 815 therein. The bore 815 may define a threaded portion 810 and an unthreaded portion 812. The fastener 800 may include a screw portion 805 for engaging the complementary threaded portion 810 of the bore 815 and a sealing portion 825 that extends from or otherwise engages the screw portion 805. The screw portion 805 may be configured to seal the bore 815 at an initial temperature.

As in previously described embodiments, the sealing portion 825 may exhibit a greater coefficient of thermal expansion than the metal member 820. The sealing portion 825 may be shaped or otherwise formed to fit within the bore 815. At an elevated temperature, such as those defined above, the sealing portion may be configured to thermally expand and seal the bore 815. The relevant thermal and material characteristics of the fastener 800 and of the member 820 may be otherwise the same as the fastener 100 and the member 120, respectively, as described with reference to FIG. 1. A detailed description will thus not be repeated here.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The subject matter illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A metal fastener comprising:
   a first screw portion threaded for engaging a complementary threaded portion of a bore of a metal member at a first temperature;
   a sealing portion arranged proximal a distal end of the first screw portion, the sealing portion having a coefficient of thermal expansion greater than a coefficient of thermal expansion of the metal member and the first screw portion,
   wherein the sealing portion is configured to thermally expand at a second temperature higher than the first temperature to engage and provide a seal against an inner circumference of the bore such that the first screw portion becomes immobile relative to the bore at the second temperature; and
   a second threaded screw portion for engaging the threaded portion of the bore, wherein the sealing portion is positioned between the first and second screw portions within the bore.

2. The fastener of claim 1, wherein the first screw portion and the metal member are made of steel and the sealing portion is made of at least one of brass, copper, and tin.

3. The fastener of claim 1, wherein the first screw portion and the metal member comprise steel, and the sealing portion comprises a polymer.

4. The fastener of claim 1, wherein the first screw portion comprises a first end and a second end, and wherein a head is provided at the first end and the sealing portion is arranged at the second end.

5. The fastener of claim 4, wherein the sealing portion is threaded to engage the threaded portion of the bore.

6. The fastener of claim 4, wherein the metal member defines a passage in fluid communication with the bore, and wherein the sealing portion is shaped to engage the bore to substantially isolate the bore from the passage at the second temperature.

7. The fastener of claim 1, wherein the sealing portion is threaded to engage the threaded portion of the bore.

8. The fastener of claim 1, wherein the metal member comprises an unthreaded passage in communication with the bore and wherein the sealing portion is shaped to extend into the passage to substantially isolate the bore from the passage.

9. The fastener of claim 1, wherein the sealing portion is threaded to engage the threaded portion of the bore.

10. The fastener of claim 1, wherein the first and second screw portions and the metal member are made of steel and the sealing portion is made of at least one of brass, copper, and tin.

11. The fastener of claim 1, wherein the first and second screw portions and the metal member are made of steel and the sealing portion is made of a polymer.

12. The fastener of claim 1, wherein the coefficient of thermal expansion of the sealing portion is at least ten percent higher than the coefficient of thermal expansion of the metal member.

13. The fastener of claim 1, wherein the sealing portion comprises:
    a central part made of carbide; and
    a surrounding outer part comprising brass.

14. A method of sealing a bore of an inflow control device, comprising:
    introducing a fastener into the bore, the bore being defined in a metal member of the inflow control device and the fastener having a first screw portion threaded to engage a complementary threaded portion of the bore and further having a sealing portion arranged proximal a distal end of the first screw portion, wherein the sealing portion has a coefficient of thermal expansion greater than a coefficient of thermal expansion of the metal member and the first screw portion, and a second threaded screw portion for engaging the threaded portion of the bore, wherein the sealing portion is positioned between the first and second screw portions within the bore;
    sealing the bore with the first screw portion when the metal member is at a first temperature;
    increasing a temperature of the inflow control device to a second temperature greater than the first temperature; and
    engaging an inner circumference of the bore with the sealing portion as the sealing portion thermally expands and thereby sealing the bore with the sealing portion when the inflow control device is at the second temperature.

15. The method of claim 14, wherein sealing the bore with the sealing portion comprises:
    thermally expanding the sealing portion at the second temperature; and
    providing a seal between the sealing portion and an inner circumference of the bore at the second temperature with the sealing portion.

16. The method of claim 15, further comprising preventing the first screw portion from moving within the bore with the sealing portion at the second temperature.

17. The method of claim 14, wherein the sealing portion is threaded to engage the complementary threaded portion of the bore, the method further comprising sealing the bore with the first screw portion and the sealing portion when the inflow control device is at the first temperature.

18. The method of claim 14, wherein the metal member defines a passage in fluid communication with the bore, the method further comprising sealing the threaded portion of the bore from the passage with the sealing portion at the second temperature.

19. The method of claim 14, wherein the metal member defines an unthreaded passage in communication with the threaded portion of the bore, and wherein sealing the bore with the sealing portion further comprises extending the sealing portion into the passage to seal the threaded portion of the bore from the passage.

* * * * *